United States Patent
Golla et al.

(10) Patent No.: US 12,401,639 B2
(45) Date of Patent: Aug. 26, 2025

(54) COMPUTER ACCESS CONTROL USING REGISTRATION AND COMMUNICATION SECRETS

(71) Applicant: ServiceNow, Inc., Santa Clara, CA (US)

(72) Inventors: Veera Sekhar Babu Golla, Hyderabad (IN); Niranjan Samanu, Hyderabad (IN); Rakesh Kumar Gyanchandani, Hyderabad (IN); Fernando Ros, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 283 days.

(21) Appl. No.: 17/879,358

(22) Filed: Aug. 2, 2022

(65) Prior Publication Data

US 2024/0048551 A1    Feb. 8, 2024

(51) Int. Cl.
*H04L 9/40* (2022.01)

(52) U.S. Cl.
CPC ........ *H04L 63/0853* (2013.01); *H04L 63/083* (2013.01)

(58) Field of Classification Search
CPC ................. H04L 63/0853; H04L 63/083
USPC .................................................. 726/4
See application file for complete search history.

(56) References Cited

U.S. PATENT DOCUMENTS

| | | | | |
|---|---|---|---|---|
| 7,603,700 | B2 * | 10/2009 | Cheng | H04L 63/08 |
| | | | | 713/157 |
| 8,041,339 | B2 * | 10/2011 | Teunissen | H04L 63/18 |
| | | | | 455/410 |
| 8,099,765 | B2 * | 1/2012 | Parkinson | H04L 9/3234 |
| | | | | 726/5 |
| 9,769,158 | B2 * | 9/2017 | Kwan | H04L 63/0853 |
| 10,277,584 | B2 * | 4/2019 | Stiegler | H04L 63/08 |
| 11,271,918 | B1 * | 3/2022 | Casillas | G06F 21/335 |
| 11,659,392 | B2 * | 5/2023 | Avetisov | H04L 63/0815 |
| | | | | 726/1 |
| 11,764,966 | B2 * | 9/2023 | Abadir | H04L 9/0819 |
| | | | | 713/176 |
| 12,003,505 | B2 * | 6/2024 | Bhattacharyya | H04L 63/06 |
| 2005/0033702 | A1 * | 2/2005 | Holdsworth | G06Q 20/108 |
| | | | | 705/67 |
| 2005/0208926 | A1 * | 9/2005 | Hamada | H04L 63/102 |
| | | | | 455/410 |
| 2007/0233789 | A1 * | 10/2007 | Agarwal | G06Q 10/107 |
| | | | | 709/206 |

(Continued)

*Primary Examiner* — Taghi T Arani
*Assistant Examiner* — Pegah Barzegar
(74) *Attorney, Agent, or Firm* — MCDONNELL BOEHNEN HULBERT & BERGHOFF LLP (57) ABSTRACT

A request associated with access to a restricted computer resource by a computer application of a device is received via a first communication medium. It is determined that the request is provided by the device with an IP address not included in a group of authorized IP addresses. A registration secret is generated. A representation associated with the registration secret is provided via a second communication medium. A token signed using the registration secret is received. In response to successfully validating the token, a communication secret is generated and associated with an identifier associated with the device. The communication secret is provided for use by the computer application of the device to access the restricted computer resource.

19 Claims, 7 Drawing Sheets

(56) References Cited

U.S. PATENT DOCUMENTS

| | | | |
|---|---|---|---|
| 2013/0101121 A1* | 4/2013 | Nordholt | H04L 9/0852 |
| | | | 380/279 |
| 2015/0310194 A1* | 10/2015 | Zhang | G06F 21/31 |
| | | | 726/9 |
| 2015/0334099 A1* | 11/2015 | Zhang | G06F 21/73 |
| | | | 726/6 |
| 2016/0380997 A1* | 12/2016 | Blasi | H04L 63/0853 |
| | | | 726/9 |
| 2017/0026379 A1* | 1/2017 | Lu | H04L 63/102 |
| 2017/0346815 A1* | 11/2017 | Andrews | H04L 63/0853 |
| 2017/0359358 A1* | 12/2017 | Alattar | G06Q 20/12 |
| 2019/0057204 A1* | 2/2019 | Marcovecchio | H04L 67/146 |
| 2019/0087595 A1* | 3/2019 | Czajkowski | H04L 63/0442 |
| 2020/0213114 A1* | 7/2020 | Sarin | H04L 9/3231 |
| 2020/0322152 A1* | 10/2020 | Smets | H04L 9/3236 |
| 2021/0185531 A1* | 6/2021 | Avetisov | H04W 12/108 |
| 2021/0281573 A1* | 9/2021 | Mars | H04L 63/0861 |
| 2022/0124095 A1* | 4/2022 | Cheng | H04L 63/101 |
| 2022/0329581 A1* | 10/2022 | Zaki | G06F 9/451 |
| 2023/0308855 A1* | 9/2023 | Matolia | H04W 8/183 |
| 2024/0048551 A1* | 2/2024 | Golla | H04L 63/0853 |

* cited by examiner

COMPUTER ACCESS CONTROL USING REGISTRATION AND COMMUNICATION SECRETS

BACKGROUND OF THE INVENTION

A computer network refers to a set of computers sharing resources located on or provided by network nodes. Computers on a network use common communication protocols over digital interconnections to communicate with one another. Network security refers to policies, processes, and/or practices intended to prevent, detect, and/or monitor unauthorized access, misuse, modification, etc. of a computer network and/or resources of the computer network. Network security involves the authorization of access to a network, which can be controlled by a network administrator. Policies, processes, and/or policies that promote tighter network security can oftentimes introduce difficulties to users attempting to access networks and/or cause more manual effort on the part of network administrators. Thus, there is a need for techniques directed toward efficiently regulating network access while maintaining tight network security.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Computer access control using registration and communication secrets is disclosed. A request associated with access to a restricted computer resource by a computer application of a device is received via a first communication medium. It is determined that the request is provided by the device with an Internet Protocol (IP) address not included in a group of authorized Internet Protocol (IP) addresses. A registration secret is generated. A representation associated with the registration secret is provided via a second communication medium. A token signed using the registration secret is received. In response to successfully validating the token, a communication secret is generated and associated with an identifier associated with the device. The communication secret is provided for use by the computer application of the device to access the restricted computer resource.

In various embodiments, a network boundary for a computing resource (e.g., an instance of a computing platform) is defined using Internet Protocol (IP) access controls. An application (also referred to as an app) of a mobile device (also referred to as a handheld computer, e.g., a smartphone) would not be able to cross the network boundary and access the computing resource if the mobile device's IP address indicates it is on an untrusted network. The techniques disclosed herein allow for secure access through mobile apps from any network (untrusted or trusted). When IP restrictions are utilized, only devices within the defined network are allowed access, while devices outside the defined network boundaries are not allowed. To allow mobile devices, which oftentimes have changing IP addresses due to their mobile nature, to have access, a prior approach has been to use mobile device management (MDM)/mobile application management (MAM) tools. However, such an approach can be problematic because oftentimes a large number of MDM/MAM tools from a large number of vendors need to be supported, which is costly, and these tools may introduce their own security concerns due to the unmonitored control they can have over mobile devices and applications. Technological benefits of the techniques disclosed herein include efficient and secure mobile app validation for network access.

Figure 1:
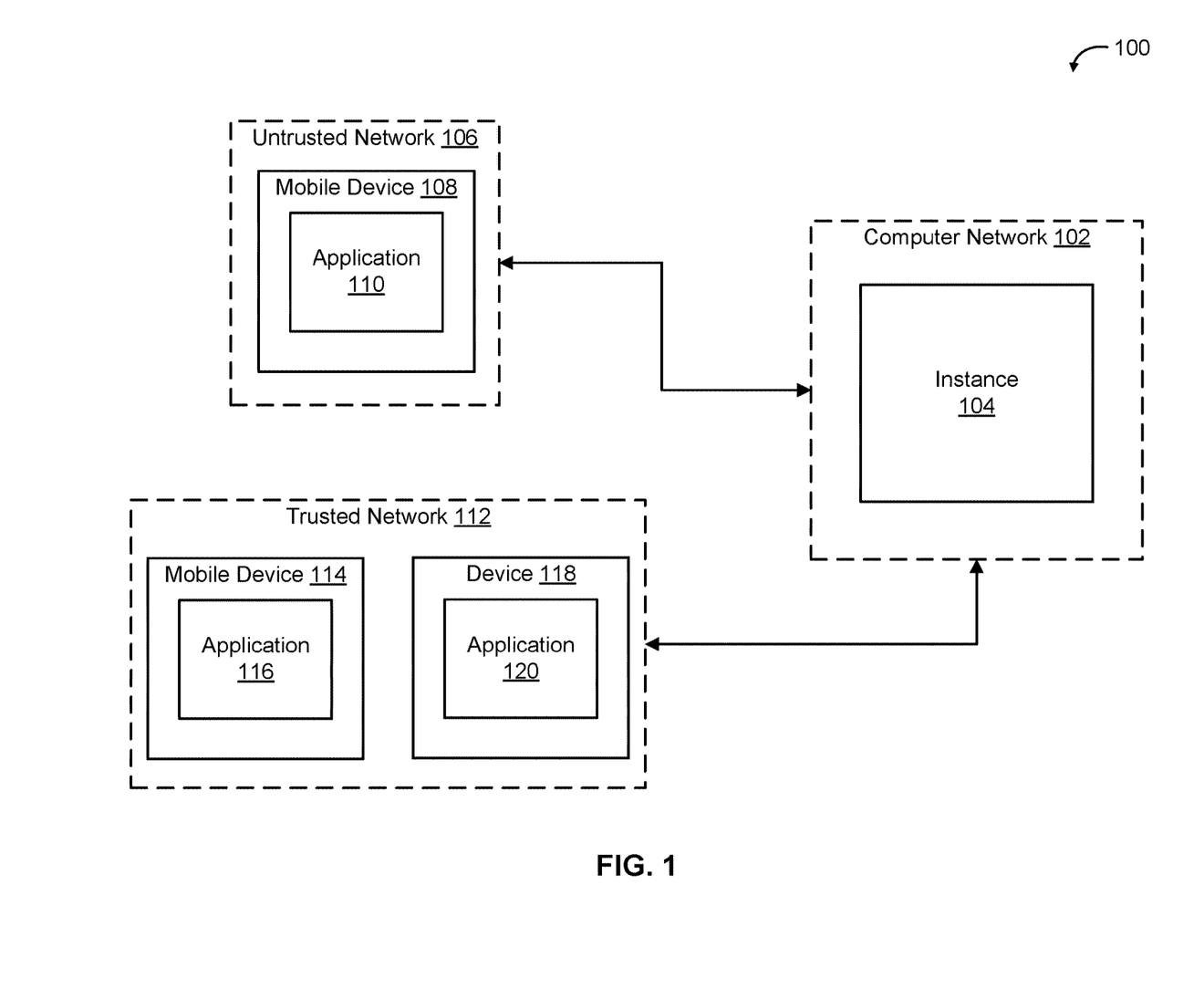
FIG. 1 is a block diagram illustrating an embodiment of a system for validating a device from an untrusted network.

FIG. 1 is a block diagram illustrating an embodiment of a system for validating a device from an untrusted network. In the example illustrated, system 100 includes computer network 102, untrusted network 106, and trusted network 112. Computer network 102 includes instance 104. In various embodiments, application 116 of mobile device 114 of trusted network 112 is able to access instance 104 of computer network 102 because trusted network 112 has been authorized to connect to computer network 102. For example, an IP address associated with trusted network 112 and/or its devices may be included in a group of authorized IP addresses. In various embodiments, application 110 of mobile device 108 of untrusted network 106 is not able to access instance 104 of computer network 102 without a registration process because untrusted network 106 has not been authorized to connect to computer network 102. As described in further detail herein, in various embodiments, application 110 will be able to access instance 104 after mobile device 108 is registered through a process that involves utilizing a device that is on trusted network 112 (e.g., device 118, which runs application 120).

Computer network 102, untrusted network 106, and trusted network 112 may be any of various types of networks. Examples of networks include one or more of the following: a direct or indirect physical communication connection, mobile communication network, Internet, intranet, Local Area Network, Wide Area Network, Storage Area Network, and any other form of connecting two or more systems, components, or storage devices together. The techniques disclosed herein address a context in which a user desires to access instance 104 from mobile device 108. Allowing for secure access from mobile devices can be challenging when network boundaries are defined using IP access controls because mobile devices can have changing IP addresses.

In various embodiments, if a mobile device is connected to a trusted network, e.g., trusted network 112, which may be a virtual private network (VPN), access is granted, and the user can use a mobile app or mobile browser on the mobile device. On the other hand, in various embodiments, if a mobile device is not connected to a trusted network, access would be denied until the mobile device is registered. In various embodiments, to register the mobile device, the user first accesses instance 104 from a device of a trusted network (e.g., device 118 belonging to trusted network 112). Examples of device 118 include a laptop computer, a desktop computer, or another computing device. In various embodiments, the user causes the device on the trusted network to display registration secret information (e.g., see FIG. 4, which is described in further detail herein) that the user can deliver to the mobile device on the untrusted network to register that mobile device. For example, a quick response (QR) code may be displayed, which the user can scan with the mobile device on the untrusted network to register that mobile device. It is also possible for unencoded text instead of a QR code to be displayed.

In various embodiments, registration is performed once, after which the mobile device will be able to access instance 104 regardless of which network it is on (e.g., even if the mobile device moves to a different untrusted network). For example, after mobile device 108 is registered, application 110 can be utilized to access instance 104 even if mobile device 108 leaves untrusted network 106 and joins another untrusted network. In various embodiments, instance 104 stores mobile device and/or mobile device application identifiers of registered mobile devices. As described in further detail herein, in various embodiments, instance 104 generates a communication secret/key that is different from the registration secret information that a registered mobile device can utilize to access instance 104. In some embodiments, the registered mobile device is only permitted to access instance 104 via an application specifically configured to communicate with instance 104 when the registered mobile device is on an untrusted network. This may be done to ensure secure communications from the untrusted network. Thus, in such scenarios, the registered mobile device would not be able to access instance 104 from a mobile browser on the mobile device, but this restriction may be removed if the mobile device transitions to a trusted network. In the example illustrated, applications 110, 116, and 120 are specifically configured to communicate with instance 104. In various embodiments, these applications are software comprised of computer instructions. In some embodiments, communication is performed via application programming interface (API) calls. In some embodiments, instance 104 is an instance of a cloud-based software platform (e.g., configured to provide processing, storage, and/or other computing functionality). In various embodiments, instance 104 is comprised of a set of applications, databases, and/or virtual machines grouped together to provide specific computing services.

In the example illustrated, trusted network 112 is a computer network that is separate from computer network 102. Trusted network 112 may also be an extension of computer network 102. For example, trusted network 112 may comprise a VPN created to establish secure access to instance 104. Device 118, which can be utilized for registration of mobile device 108, is shown to be a part of trusted network 112. It is also possible for a user to use a similar device (not shown in FIG. 1) belonging to computer network 102 itself to perform the registration functions described herein.

The techniques described herein are superior to prior approaches in various ways. Prior approaches that rely on installing an MDM tool on a mobile device to communicate with instance 104 (to indicate to instance 104 that a device is trusted) has the disadvantage that the MDM can have access to the entire device, which is undesirable for many users. Furthermore, a network administrator most likely needs to undertake manual effort to configure the MDM. Another approach that does not require an MDM is to have a network/instance administrator manually register mobile devices. However, this is effort-intensive on the part of human workers and may also ultimately require an MDM or MDM-like tool to be installed as a way for mobile devices to send access credentials. The techniques disclosed herein have the technological advantage of being automated and not dependent on MDM tools.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, other trusted and untrusted networks and any number of mobile and and/or other devices within those networks may exist. The number of components and the connections shown in FIG. 1 are merely illustrative. Components not shown in FIG. 1 may also exist.

Figure 2:
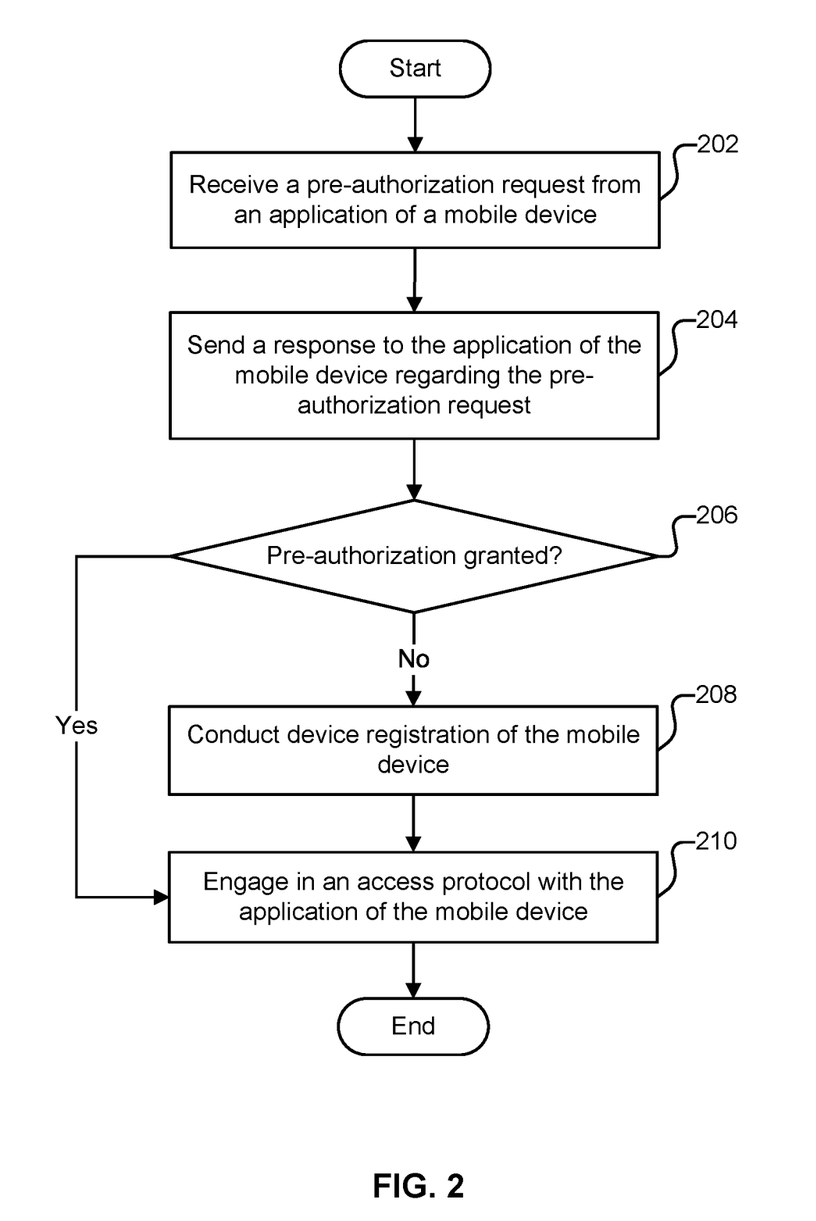
FIG. 2 is a flow diagram illustrating an embodiment of a process for responding to an access request.

FIG. 2 is a flow diagram illustrating an embodiment of a process for responding to an access request. In some embodiments, the process of FIG. 2 is performed by instance 104 of FIG. 1. An example use scenario associated with the process of FIG. 2 is one in which an entity has a computer network (e.g., computer network 102 of FIG. 1) that is restricted based on IP address and a user of the computer network desires access from outside the network using a mobile device.

At 202, a pre-authorization request is received from an application of a mobile device. For example, application 110 of mobile device 108 of FIG. 1 may send to instance 104 a request to access instance 104. In various embodiments, the purpose of the pre-authorization request is to determine whether mobile device registration is required.

At 204, a response to the application of the mobile device regarding the pre-authorization request is sent. In various embodiments, the response includes an allowance or denial of the pre-authorization request. In various embodiments, allowance or denial is determined based at least in part on whether the mobile device has an IP address that is included in a group of authorized IP addresses. Stated alternatively, if the mobile device has an IP address that is included in a whitelist of IP addresses, the pre-authorization request would be granted (mobile device registration not required). Otherwise, the pre-authorization request would be denied, and then mobile device registration is initiated.

At 206, it is determined whether the pre-authorization (request) is granted. If the pre-authorization request is not granted, a registration of the mobile device is performed (step 208). If the pre-authorization request is granted, the registration (step 208) is skipped.

At 208, device registration of the mobile device is conducted. In various embodiments, to register itself as a trusted device, the mobile device shares information that is received from a trusted source. For example, the mobile device may send back a registration secret that is generated by a device (that the user can also access) from a trusted network. Further details of an example registration process are given below (e.g., see FIG. 3). After successful registration, the mobile device can be treated as a trusted device. In various embodiments, the mobile device is given a key that it can utilize for subsequent access and that can be validated on the instance side. In various embodiments, after registration of a mobile device from an untrusted network, an application of the mobile device engages in an existing authentication mechanism as an additional step required to gain access. For example, the authentication mechanism may involve inputting a user login and password.

At 210, an access protocol is engaged in with the application of the mobile device. For example, the access protocol may include requesting, receiving, and validating a username and password. For security, it is necessary to control access based on users as well as devices. This prevents an unauthorized user from gaining access by using an authorized user's mobile device in an unpermitted manner. Further details of an example access process are described in further detail below (e.g., see FIG. 5).

Figure 3:
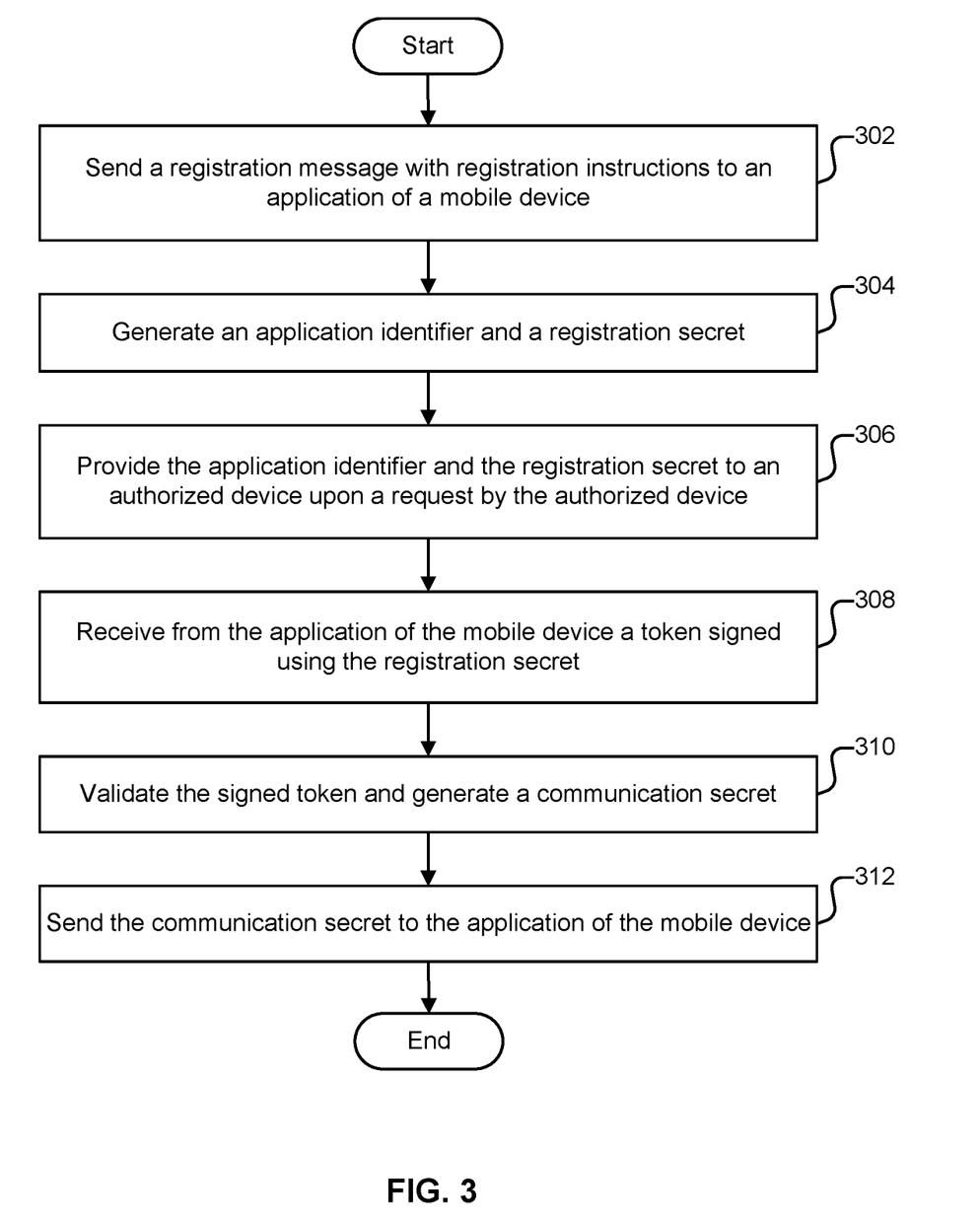
FIG. 3 is a flow diagram illustrating an embodiment of a process for conducting device registration.

FIG. 3 is a flow diagram illustrating an embodiment of a process for conducting device registration. In some embodiments, the process of FIG. 3 is performed by instance 104 of FIG. 1. In some embodiments, at least a portion of the process of FIG. 3 is performed in 208 of FIG. 2.

At 302, a registration message with registration instructions is sent to an application of a mobile device. In some embodiments, the application and mobile device are application 110 and mobile device 108, respectively, of FIG. 1. Example text of registration instructions that may be included in the registration message are as follows: "Step 1: Log in using laptop or desktop; Step 2: Go to profile page; Step 3: Click on 'register a trusted mobile device'; Step 4: Scan QR code or type the number". In various embodiments, the registration message is transmitted in response to a request for access from a mobile device that is connected to an untrusted network.

At 304, an application identifier and a registration secret are generated. The application identifier can be associated with the mobile device. In some embodiments, the application identifier and secret are generated upon the request for access from the mobile device. It is also possible to wait until a user of the mobile device has logged into a laptop or desktop and clicked on "register a trusted mobile device" per the above example instructions. In various embodiments, the application identifier is a unique string that can be used to uniquely identify the application and/or the mobile device. In various embodiments, the registration secret is also a string and is provided to the application of the mobile device so that the application of the mobile device can sign a device registration request using the registration secret. Signing the device registration request with the registration secret indicates that the mobile device is a trusted device due to it possessing secret information generated by the registration source (e.g., instance 104 of FIG. 1).

At 306, the application identifier and the registration secret are provided to an authorized device upon request by the authorized device. The authorized device is a device separate from the mobile device to be registered. In various embodiments, the authorized device is a laptop or desktop that is connected to a trusted network. In some embodiments, the authorized device is device 118 of FIG. 1. The user may use application 120 of device 118 to securely connect to the registration source (the instance) by logging into application 120. In various embodiments, the authorized device requests the application identifier and the registration secret when the user clicks on "register a trusted mobile device" per the above example instructions. Providing the application identifier and the registration secret here is secure because the authorized device is within a defined network boundary of the instance.

Figure 4:
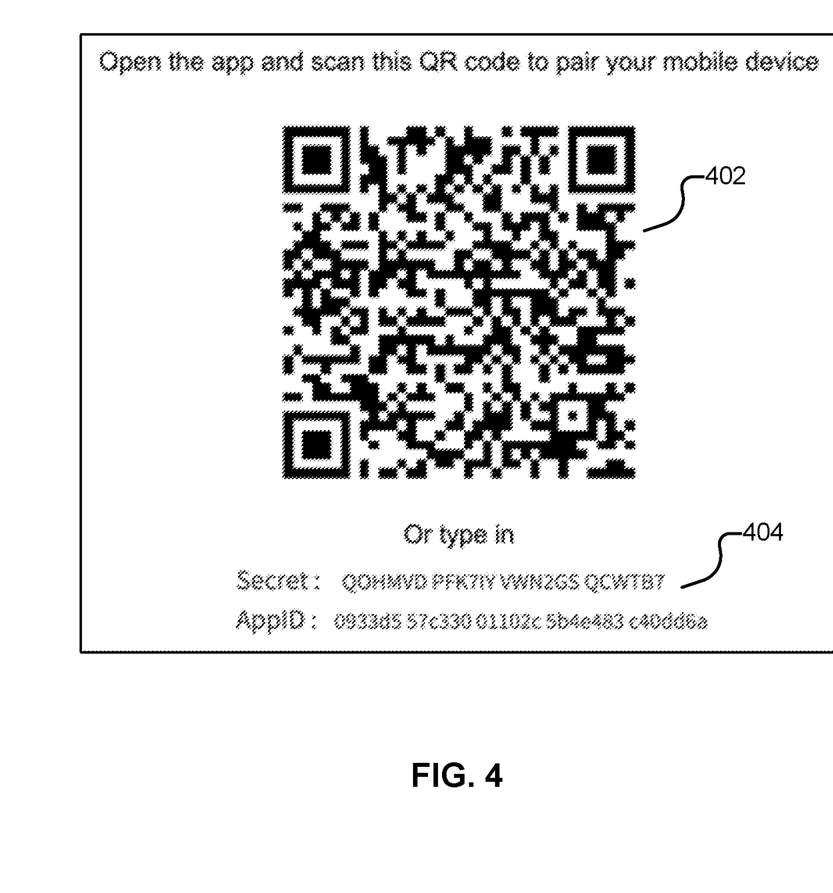
FIG. 4 is an example of a presentation of a registration secret.

In some embodiments, the application identifier and the registration secret are provided and displayed as a QR code, which has the advantage of allowing the user, who presumably is in possession of the mobile device, to quickly capture the application identifier and the registration secret by using the mobile device to scan the QR code. QR code 402 of FIG. 4 is an example of such a QR code. FIG. 4 also shows an example of instructions to the user to scan the QR code. Scanning the QR avoids requiring the user to record the strings corresponding to the application identifier and the registration secret, which can be time-consuming and error prone. In some embodiments, the user is also given the option to manually enter the application identifier and the registration secret into the application of the mobile device. Text 404 of FIG. 4 is an example of the registration secret and the application identifier displayed in an unencoded text format. As a whole, FIG. 4, is an example of a representation of the application identifier and the registration secret, in encoded and unencoded formats, to be displayed to the user with instructions on how to input the application identifier and the registration secret. In alternative embodiments, it is also an option for the user to obtain the QR code or plain text version from another device that is secure but not necessarily connected to a trusted network (e.g., a laptop that has previously been registered and also connected to the untrusted network to which the mobile device is connected). It is also possible to allow the user to register based on an email sent to a verified email address of the user. It is possible to use a registered email/phone so that a user does not need to have access to a trusted network. The registration secret can be obtained through the user's already registered email or phone number. This mode of registration may be limited to low privileged users.

At 308, a token signed using the registration secret is received from the application of the mobile device. In various embodiments, after the user scans a QR code or manually inputs the application identifier and the registration secret, the application of the mobile device stores the application identifier and the registration secret and automatically generates a network token to be sent back to the instance as part of the registration process. The network token indicates to the instance that the mobile device can be trusted because it possesses the registration secret, which the instance has generated. By sending the application identifier, information associated with the mobile device can be uniquely stored in the instance. In some embodiments, the network token is sent using one or more API calls.

In various embodiments, network token data (e.g., the application identifier and/or other information, such as a timestamp) is sent with an encrypted piece of data for validation purposes. Various types of encryption techniques may be used. For example, encryption can be performed using HMACSHA256, a type of keyed hash algorithm that is constructed from the SHA-256 (Secure Hash Algorithm 256) hash function and used as a Hash-based Message Authentication Code (HMAC). HMACSHA256 can mix the registration secret (acting as a secret key) with message data (e.g., the application identifier and/or other data), hash the result with a hash function, mix that hash value with the secret key again, and then apply the hash function a second time. HMACSHA256 can be used to determine whether a message has been tampered with because the mobile application and the instance share the secret key. The mobile application can compute the hash value for token data and send both the token data and hash value in a single message. The instance can recalculate the hash value on token data and check for a match. Any change to the token data results in a mismatch because knowledge of the secret key is required to produce the correct hash value.

In some embodiments, timestamp information is included in the network token data. Including a timestamp can be useful in order to introduce a timeout mechanism to the registration process. For example, if the instance determines based on the timestamp that the network token was sent more than a specified amount of time after the instance generated and/or displayed the application identifier and the registration secret, the instance may determine that the registration attempt is invalid. In such a scenario, in various embodiments, information associated with the particular invalid registration will be deleted from a database of device registration information (e.g., as part of a cleanup process to remove unnecessary data). In various embodiments, various types of identifying information with respect to the mobile device is sent to the instance for the instance to associate and store with the application identifier. For example, a device identifier, a device version, an application version, an operating system type and/or version, a device model name, and so forth may be sent.

At 310, the signed token is validated and then a communication secret is generated. In various embodiments, the signed token is validated based on the instance having the registration secret. For example, in some embodiments, the registration secret is used to generate a hash value (e.g., using HMACSHA256) that is compared to a hash value generated by the application of the mobile device. Matching hash values would validate the signed token. In the event validation fails, in various embodiments, an error response with error details is sent back to the application of the mobile device. In various embodiments, upon successful registration, the communication secret, which is different from the registration secret, is generated. The communication secret can be utilized by the mobile application in its subsequent communication with the instance. In some embodiments, the communication secret is a string that is different from but generated in the same manner as the registration secret. Because the communication secret exists, the registration secret can be discarded after its one-time use described above.

At 312, the communication secret is sent to the application of the mobile device. In various embodiments, the communication secret is used by the application of the mobile device to sign network tokens associated with regular access after registration. Using the communication secret for subsequent communications instead of using the registration key has several advantages. Using the communication secret can be more secure because the communication secret does not need to be displayed in an unencrypted form, whereas the registration secret needs to be shown to the user, either as plain text or as a QR code (the QR code is encoded but not encrypted). The communication secret can be administered automatically between computers so that there is no need for a human to view it. In addition, the communication secret can be in a different (e.g., longer) format than the registration secret. The communication secret is not constrained to be of a reasonable length, as the registration secret is in the plain text scenario, that a human can manually record and input. Using timestamps, it is also possible to implement expiration times for communication secrets. For example, each communication secret may be revoked after a specified number of days, which would cause the user to re-register.

Various other features may exist. For example, mobile device access can be revoked by an administrator. This can be useful in many scenarios, e.g., if the administrator suspects that the mobile device has been hacked. It is also possible for a user to revoke a mobile device (e.g., if the user is no longer using the mobile device and would like to register a different mobile device). Revocation can be performed at the device level (e.g., at the level of mobile device 108) and/or the application level (e.g., at the level of application 110). In some embodiments, device registration (and/or login) is dependent on the geographic location of the mobile device. For example, an instance administrator may determine that specified regions of the world pose particular security risks and disallow registration from these regions. Mobile device location determination may be based on global positioning system (GPS) and/or IP address data.

FIG. 4 is an example of a presentation of a registration secret. FIG. 4 is described above in the discussion associated with FIG. 3.

Figure 5:
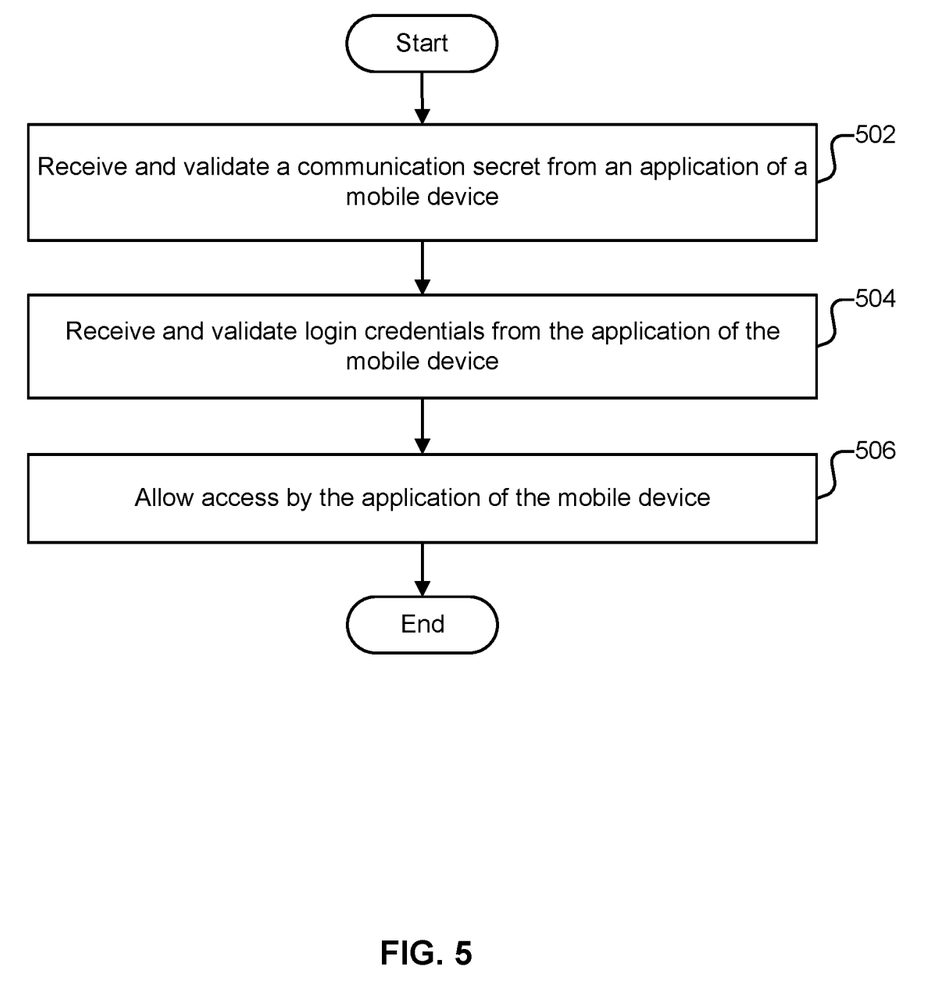
FIG. 5 is a flow diagram illustrating an embodiment of a process for engaging in an access protocol.

FIG. 5 is a flow diagram illustrating an embodiment of a process for engaging in an access protocol. In some embodiments, the process of FIG. 5 is performed by instance 104 of FIG. 1. Stated alternatively, the process of FIG. 5 may be performed by an instance of a software platform. In some embodiments, at least a portion of the process of FIG. 5 is performed in 210 of FIG. 2.

At 502, a communication secret from an application of a mobile device is received and validated. In some embodiments, the communication secret is the communication secret generated in 310 of FIG. 3. In some embodiments, the application and mobile device are application 110 and mobile device 108, respectively, of FIG. 1. The communication secret is used to verify that the application of the mobile device and/or the mobile device itself are authorized to obtain access. In some embodiments, the communication secret is communicated in the form of a network token signed with the communication secret in a manner analogous to how a network token can be signed with the registration secret of the process of FIG. 3. For example, instead of using the registration secret, which is used only once for registration, in the HMACSHA256 approach described with respect to the process of FIG. 3, the communication secret can be used. Stated alternatively, HMAC-SHA256 can mix the communication secret (acting as a secret key) with message data (e.g., the application identifier and/or other data, such as a timestamp), hash the result with a hash function, mix that hash value with the communication key again, and then apply the hash function a second time.

At 504, login credentials from the application of the mobile device are received and validated. In various embodiments, in addition to device tracking, the instance also keeps track of which users are logging in to access the instance. Thus, if a user that is known to be unauthorized attempts to gain access through a registered device, a mechanism is in place to block the user. Stated alternatively, mobile device access control (via validating the communication secret at 502) and user access control (via validating login credentials) are distinct layers of security. In some embodiments, login credentials include a username and password. In some embodiments, multi-factor authentication (MFA) is also utilized. For example, in addition to requiring a username and password, the instance may also require the user to enter a separate authentication code provided to the user via a verified email address, a verified phone number, or an authentication application. In some embodiments, MFA is utilized if a risk assessment indicates a heightened security risk (e.g., if the user has not logged in for a specified number of days, the user is located in specified regions of the world, etc.). In some embodiments, login access is limited by role. For example, only more senior members of an organization may be allowed to log in from outside of a trusted network.

At 506, the application of the mobile device is allowed access. In some embodiments, activities that a user can engage in are limited depending on who the user is (e.g., depending on the user's role and seniority in an organization). For example, some users may be limited to viewing but not modifying data once they are logged in from an untrusted network. In some embodiments, users are required to log in every specified number of days to avoid having their device registration revoked, which would require the process of FIG. 3 to be re-performed. It is also possible to activate MFA is a user has not logged in within the specified number of days as an additional security measure that is not as restrictive as requiring re-registration of the mobile device.

Figure 6:
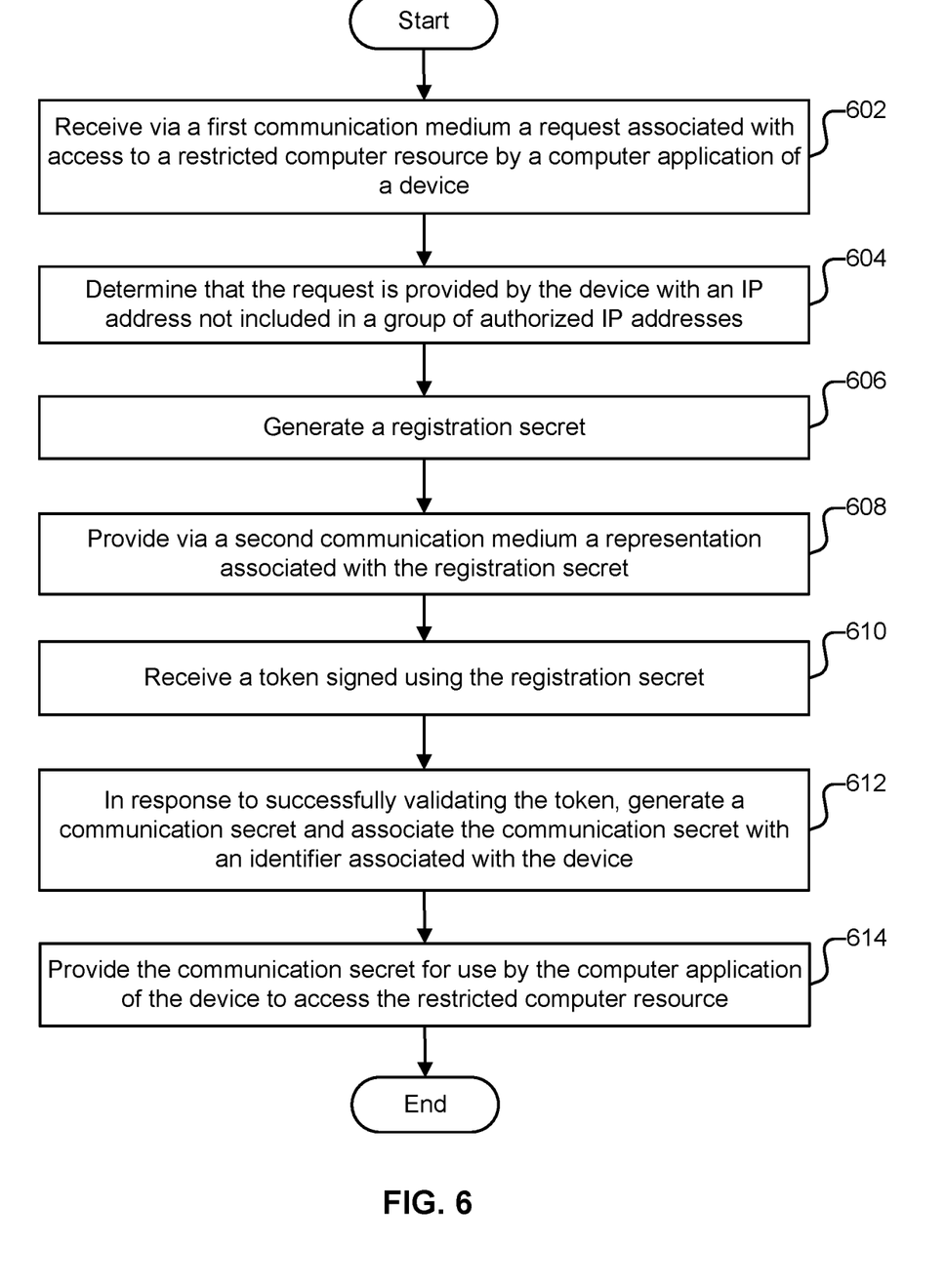
FIG. 6 is a flow diagram illustrating an embodiment of a process for validating a device from an untrusted network.

FIG. 6 is a flow diagram illustrating an embodiment of a process for validating a device from an untrusted network. In some embodiments, the process of FIG. 6 is performed by instance 104 of FIG. 1.

At 602, a request associated with access to a restricted computer resource by a computer application of a device is received via a first communication medium. In some embodiments, the request is sent from mobile device 108 of FIG. 1. Stated alternatively, in some embodiments, the computer application and the device are application 110 and mobile device 108, respectively, of FIG. 1. In some embodiments, the restricted computer resource is included in computer network 102 of FIG. 1 (e.g., instance 104 of FIG. 1). In some embodiments, the first communication medium is a communication channel to untrusted network 106 of FIG. 1 or another untrusted network.

At 604, it is determined that the request is provided by the device with an IP address not included in a group of authorized IP addresses. The IP address not being in the group of authorized IP addresses indicates that the device is attempting to access the restricted computer resource from an untrusted computer network. In such a scenario, for network security reasons, registration of the device is desirable.

At 606, a registration secret is generated. In some embodiments, the registration secret includes a sequence of alphanumeric characters. The registration secret can be provided to the computer application of the device so that the computer application can sign a device registration request using the registration secret. Signing the device registration request with the registration secret indicates that the device is a trusted device due to it possessing secret information generated by the recipient of the request to access the restricted computer resource.

At 608, a representation associated with the registration secret is provided via a second communication medium. In some embodiments, the representation includes a QR code that at least encodes the registration secret. The representation may also include an unencoded plain text version of the registration secret. In some embodiments, an application identifier is also provided along with the registration secret. In some embodiments, the second communication medium is a communication channel to trusted network 112 of FIG. 1 or another trusted network. With a trusted network, if the device had requested access from the trusted network, its IP address would have been included in the group of authorized IP addresses.

At 610, a token signed using the registration secret is received. In some embodiments, the token is a network token that includes a hash value derived at least in part from the registration secret. For example, the registration secret may be utilized by the HMACSHA256 keyed hash algorithm to generate a hash value that can be validated by instance 104 of FIG. 1. The recipient of the request (e.g., instance 104 of FIG. 1) can validate by deriving the same hash value using the registration secret that it already possesses.

At 612, in response to successfully validating the token, a communication secret is generated, and the communication secret is associated with an identifier associated with the device. In various embodiments, the communication secret and the identifier are stored in a datastore. In various embodiments, the communication secret is different from the registration secret. In various embodiments, the communication is utilized for subsequent communications with the device, whereas the registration secret is intended for one-time use during registration of the device. Associating the communication secret with the identifier and storing them in the datastore allows for keeping track of usage and access statistics associated with the device. In various embodiments, many identifiers and their corresponding communication secrets are stored in the datastore.

At 614, the communication secret is provided for use by the computer application of the device to access the restricted computer resource. In various embodiments, with the communication secret, the computer application of the device is allowed access to the restricted computer resource even if the device is on an untrusted computer network. Possession of the communication secret indicates that the device is a trusted device (e.g., indicates that the device has gone through a registration process that has verified the device).

Figure 7:
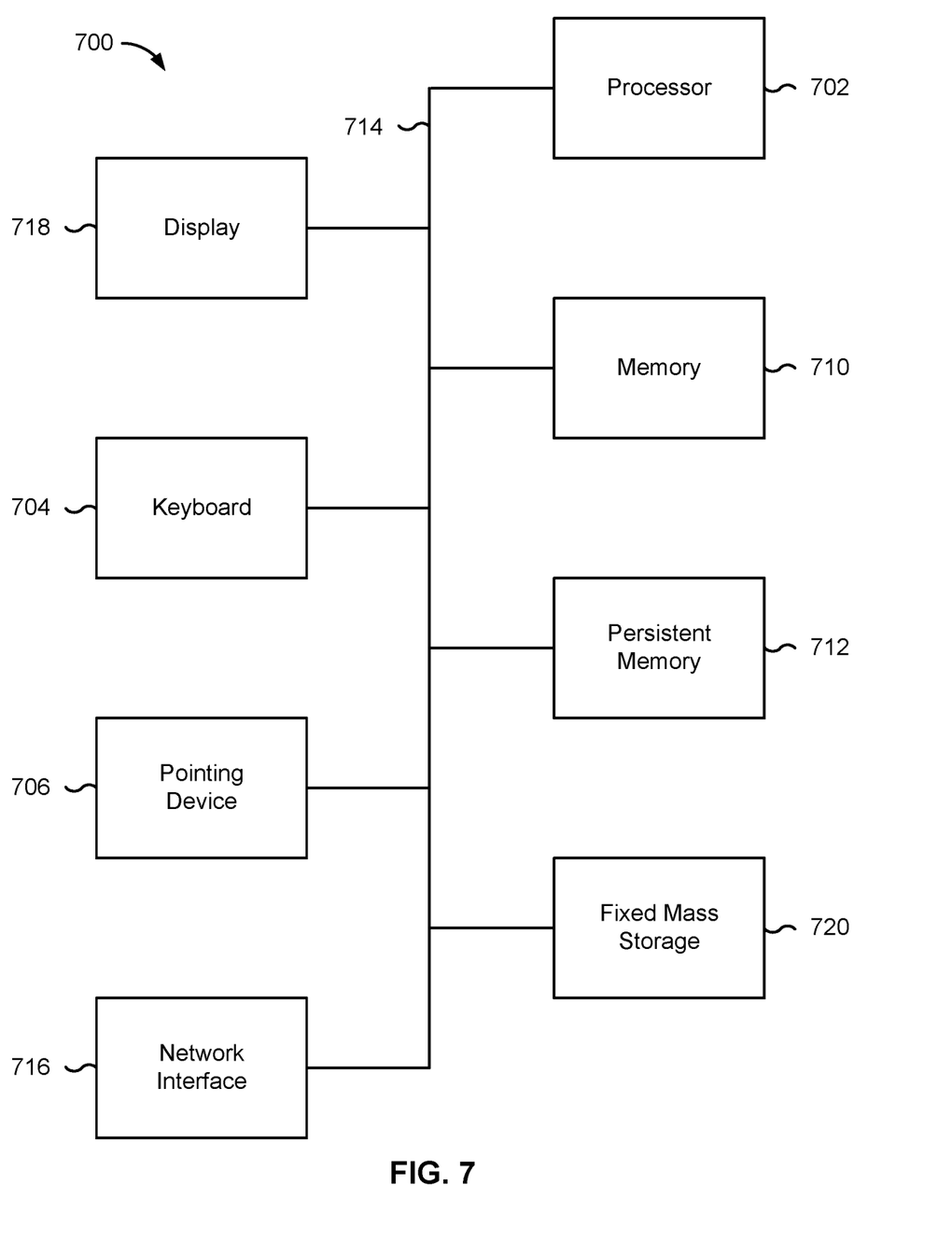
FIG. 7 is a functional diagram illustrating a programmed computer system.

FIG. 7 is a functional diagram illustrating a programmed computer system. In some embodiments, the processes of FIGS. 2, 3, 5, and/or 6 are executed by computer system 700. In some embodiments, instance 104 of FIG. 1 includes computer system 700.

In the example shown, computer system 700 includes various subsystems as described below. Computer system 700 includes at least one microprocessor subsystem (also referred to as a processor or a central processing unit (CPU))

702. Computer system 700 can be physical or virtual (e.g., a virtual machine). For example, processor 702 can be implemented by a single-chip processor or by multiple processors. In some embodiments, processor 702 is a general-purpose digital processor that controls the operation of computer system 700. Using instructions retrieved from memory 710, processor 702 controls the reception and manipulation of input data, and the output and display of data on output devices (e.g., display 718).

Processor 702 is coupled bi-directionally with memory 710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also, as is well known in the art, primary storage typically includes basic operating instructions, program code, data, and objects used by processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

Persistent memory 712 (e.g., a removable mass storage device) provides additional data storage capacity for computer system 700, and is coupled either bi-directionally (read/write) or uni-directionally (read only) to processor 702. For example, persistent memory 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of fixed mass storage 720 is a hard disk drive. Persistent memory 712 and fixed mass storage 720 generally store additional programming instructions, data, and the like that typically are not in active use by the processor 702. It will be appreciated that the information retained within persistent memory 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, pointing device 706 can be a mouse, stylus, track ball, or tablet, and is useful for interacting with a graphical user interface.

Network interface 716 allows processor 702 to be coupled to another computer, computer network, or telecommunications network using a network connection as shown. For example, through network interface 716, processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect computer system 700 to an external network and transfer data according to standard protocols. Processes can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving via a first communication medium a request associated with access to a restricted computer resource by a computer application of a first device;
   determining that the request is provided by the first device having an Internet Protocol (IP) address not included in a group of authorized Internet Protocol (IP) addresses;
   generating a registration secret for the computer application of the first device;
   providing the generated registration secret to an authorized device having an IP address included in the group of authorized IP addresses, wherein, via a second communication medium, a representation associated with the registration secret is provided by the authorized device to the first device, wherein the second communication medium is different than the first communication medium;

receiving a token signed by the first device by the generated registration secret;

validating the token signed by the first device by the generated registration secret;

in response to successfully validating the token, generating a communication secret and associating the communication secret with an identifier associated with the first device; and providing the communication secret for use by the computer application of the first device to access the restricted computer resource.

2. The method of claim 1, wherein the first communication medium comprises a communication channel to an untrusted computer network.

3. The method of claim 1, wherein the restricted computer resource includes an instance of a software platform.

4. The method of claim 1, wherein the first device is a mobile device.

5. The method of claim 1, wherein the computer application is a mobile application configured to communicate with an instance of a software platform.

6. The method of claim 1, wherein the registration secret includes a sequence of alphanumeric characters.

7. The method of claim 1, wherein the second communication medium comprises a communication channel to a trusted computer network.

8. The method of claim 1, wherein the representation includes a machine-readable optical label encoding the registration secret.

9. The method of claim 8, wherein the machine-readable optical label includes a Quick Response (QR) code.

10. The method of claim 1, wherein the representation includes an unencoded text version of the registration secret.

11. The method of claim 1, wherein the representation includes the identifier associated with the first device.

12. The method of claim 1, wherein the token includes the identifier associated with the first device.

13. The method of claim 1, wherein the token includes a timestamp associated with when the token has been sent.

14. The method of claim 1, wherein the token includes a hash value generated based at least in part on the registration secret.

15. The method of claim 1, wherein validating the token includes determining a validation hash value based at least in part on the registration secret and comparing the validation hash value to a token hash value included in the token.

16. The method of claim 1, further comprising receiving a subsequent token signed using the communication secret.

17. The method of claim 16, wherein the subsequent token includes a hash value generated based at least in part on the communication secret.

18. A system, comprising:

one or more processors configured to:

receive via a first communication medium a request associated with access to a restricted computer resource by a computer application of a first device;

determine that the request is provided by the first device having an Internet Protocol (IP) address not included in a group of authorized Internet Protocol (IP) addresses;

generate a registration secret for the computer application of the first device;

provide the generated registration secret to an authorized device having an IP address included in the group of authorized IP addresses, wherein, via a second communication medium, a representation associated with the registration secret is provided by the authorized device to the first device, wherein the second communication medium is different than the first communication medium;

receive a token signed by the first device by the generated registration secret;

validate the token signed by the first device by the generated registration secret;

in response to successfully validating the token, generate a communication secret and associate the communication secret with an identifier associated with the first device; and provide the communication secret for use by the computer application of the first device to access the restricted computer resource; and a memory coupled to at least one of the one or more processors and configured to provide at least one of the one or more processors with instructions.

19. A computer program product embodied in a non-transitory computer readable medium and comprising computer instructions for:

receiving via a first communication medium a request associated with access to a restricted computer resource by a computer application of a first device;

determining that the request is provided by the first device having an Internet Protocol (IP) address not included in a group of authorized Internet Protocol (IP) addresses;

generating a registration secret for the computer application of the first device;

providing the generated registration secret to an authorized device having an IP address included in the group of authorized IP addresses, wherein, via a second communication medium, a representation associated with the registration secret is provided by the authorized device to the first device, wherein the second communication medium is different than the first communication medium;

receiving a token signed by the first device by the generated registration secret;

validating the token signed by the first device by the generated registration secret;

in response to successfully validating the token, generating a communication secret and associating the communication secret with an identifier associated with the first device; and providing the communication secret for use by the computer application of the first device to access the restricted computer resource.

\* \* \* \* \*